March 26, 1935. O. E. ANDRUS ET AL 1,995,492
DEVICE FOR DETERMINING THE COMPOSITION OF FLUID BODIES IN MOTION
AND FOR SELECTIVELY DISTRIBUTING THE FLOW OF PORTIONS
OF SAID BODIES TO PREDETERMINED LOCATIONS
Filed June 11, 1928
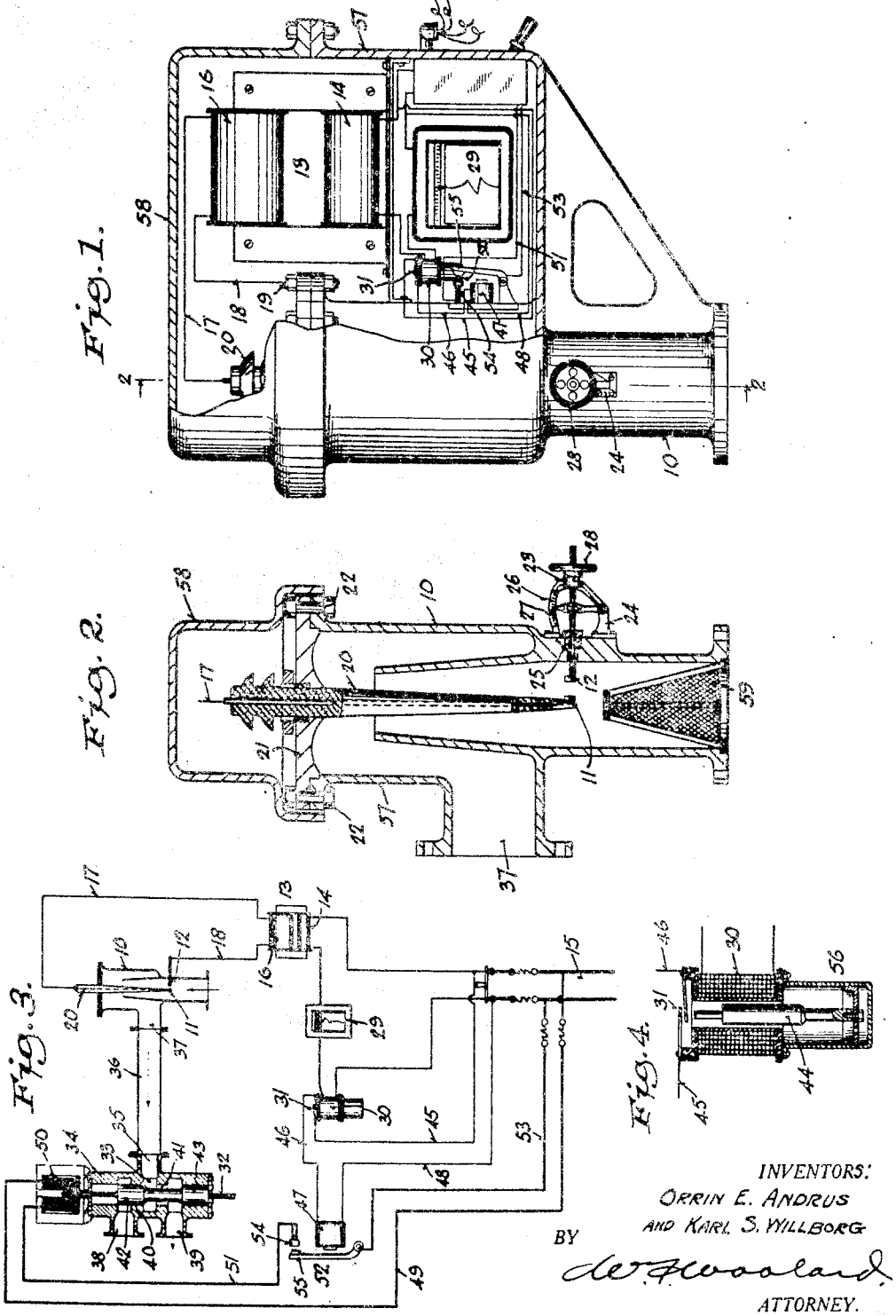
INVENTORS:
ORRIN E. ANDRUS
AND KARL S. WILLBORG
BY
W. F. Woodard
ATTORNEY.

Patented Mar. 26, 1935

1,995,492

UNITED STATES PATENT OFFICE 1,995,492

DEVICE FOR DETERMINING THE COMPOSITION OF FLUID BODIES IN MOTION AND FOR SELECTIVELY DISTRIBUTING THE FLOW OF PORTIONS OF SAID BODIES TO PREDETERMINED LOCATIONS

Orrin E. Andrus and Karl S. Willborg, Milwaukee, Wis., assignors to A. O. Smith Corporation, Milwaukee, Wis., a corporation of New York Application June 11, 1928, Serial No. 284,472

4 Claims. (Cl. 175—183)

The invention relates to a device for determining the composition of a flowing body consisting of a plurality of different (either miscible or non-miscible) substances, such as, merely for example, oil having a water content, and for selectively distributing the flow of portions of said body, depending upon the composition of a portion, to different and predetermined locations.

Our device consists essentially of spaced apart electrodes properly exposed to a flowing body, such as flowing oil having a water content, and maintained at a high potential difference, as by a high tension transformer, in a circuit which is utilized to detect the composition of said flowing body, as, for example, the water content of flowing oil. And our device desirably additionally includes an automatically regulated valve arranged to control the flow of said body in such manner that different portions thereof of varying composition will be selectively distributed to predetermined locations.

The detecting means can be located in the primary or secondary circuit of the transformer, or otherwise, so that a definite change in the composition of the flowing body, as, for example, a change in the percentage of water in flowing oil, will produce a definite change in the transformer current to which the detecting means will be responsive.

In the disclosed practical operation of our invention, used to detect the amount of water in oil, the oil, as for instance, petroleum oil, to be inspected is made to flow past fixed (or adjustable) spaced apart electrodes exposed to the flowing oil and constituting terminals of a high tension transformer circuit between which a definite current will flow when oil having a definite water content is present at the location of the said electrodes. A detecting means responsive to the flow of current due to presence of water, includes a recording ammeter indicative of the water content, and the said detecting means is constructed to operate a balanced valve adapted to allow the continuous flow of the oil past the said electrodes, but to distribute the flow of relatively "wet" and relatively "dry" oil to separate pipe lines. The use of a mixing device is advisable in order to obtain at all times a representative sample of oil at the electrode terminals.

Figure 1 is an elevational view, partially broken away and partially in section, of a device in which the features of the invention are incorporated.

Fig. 2 is a longitudinal sectional view detailing the element through which the flowing body travels, taken on line 2—2 in Fig. 1.

Fig. 3 discloses the device of Fig. 1 diagrammatically.

Fig. 4 is an enlarged longitudinal sectional view detailing one of the solenoids of the device.

When the device is to be utilized to detect the amount of water in oil, the oil to be inspected may be made to flow through a pipe 10, in the direction indicated by the arrows. Spaced apart electrodes, comprising a central electrode 11, and a grounded electrode 12, in said pipe are exposed to the flowing oil and are arranged in the circuit of a high tension transformer 13, to constitute the terminals of said circuit.

The transformer 13 includes a primary coil 14 adapted to be connected with a source of alternating current supply 15, and a secondary coil 16 one wire 17 of which leads to the central electrode 11 and the other wire 18 of which is attached to the pipe 10, as at 19, having the grounded electrode 12.

The central electrode 11 is surrounded by a relatively long insulating electrode support 20 fitted in fluid tight manner into a plate 21 secured, as at 22, upon an end of the pipe 10. See Fig. 2.

The insulation 20 extends into a sleeve which in this case constitutes a prolongation of the inlet portion of the fluid conducting channel 10. This sleeve acts to direct the flowing medium along the surface of the insulation 20 and sweeps away any accumulation of moisture or other substance which would tend to decrease the effectiveness of such insulation. The taper of the sleeve combines with the taper of the electrode to raise the rate of flow of the medium as it traverses this insulation.

The grounded electrode 12 is threaded into a boss 23 of a bracket 24 upon the pipe 10, and the inner portion of the said electrode 12 passes through a bushed opening 25 in said pipe. The bracket 24 is calibrated, as denoted at 26, and a pointer 27 pivoted upon the bracket and associated with the electrode 12 is adapted to be moved along the calibrations of the bracket when the finger piece 28 is turned to adjust the electrodes, so that a gap between the electrodes of predetermined and set length to suit a particular condition can be accurately obtained, as will be understood.

An ammeter 29 in the transformer circuit is for the purpose of indicating and recording the current passing between the electrodes 11 and 12, via oil at the location of said electrodes.

The transformer circuit also includes a solenoid 30 for operating a relay switch 31, which in turn is adapted to operate a balanced valve 32 capable of allowing the continuous flow of the oil through the pipe 10 past the electrodes 11 and 12, but set up to distribute the flow of relatively "wet" and relatively "dry" oil to separate pipe lines. As disclosed, the balanced valve 32 is slidable longitudinally in the chamber 33 of a casing 34, which includes an inlet 35 connected with a pipe 36 leading from an outlet 37 from the pipe 10, and two outlets, designated 38 and 39. The chamber 33 includes a passage 40 leading to the outlet 38 and a passage 41 leading to the outlet 39, and the balanced valve 32 includes spaced apart enlargements, designated 42 and 43, respectively, adapted to hold the passage 41 open and the passage 40 closed when the balanced valve is depressed, and the passage 40 open and the passage 41 closed when the balanced valve is elevated. See Fig. 3.

In practice, the electrodes 11 and 12 are spaced apart a distance precluding passage between said electrodes, via oil flowing through the pipe 10 at the location of said electrodes and having water content less than a predetermined amount, of sufficient current to actuate the solenoid 30 to cause it to operate the relay switch 31, but adapted to allow passage of sufficient current to actuate said solenoid to operate said relay switch when the amount of water in the oil at the electrodes is equal to or in excess of said predetermined amount of water. Naturally, the ammeter 29, in the transformer circuit, continuously indicates and records the current passing between the electrodes.

So long as the current passing through the solenoid 30 (in the transformer circuit) is insufficient to cause said solenoid to operate the relay switch 31, the balanced valve remains depressed by gravity, as it is shown in Fig. 3, and the passage of oil from the pipe 10 and the casing 34 is via the port 37, the pipe 36, the port 35, the passage 41, and the port 39. When, however, the water content of the oil reaches the predetermined amount for which the electrodes are set, the solenoid 30 is energized to an extent sufficient to lift the armature 44 thereof and cause the relay switch 31 to be closed. Upon the occurrence of this event, a relay circuit, consisting of lead wire 45 from the source of alternating current, the said relay switch 31, lead wire 46, magnet 47 and lead wire 48 to the said source of alternating current is closed, and thus, the said magnet 47 is energized. A second relay circuit consists of a lead wire 49 from the alternating current supply to a second solenoid 50 the armature of which is integral with the balanced valve 32, a lead wire 51 from said second solenoid to a second relay switch 52, and a lead wire 53 from said switch 52 to the alternating current supply. The relay switch 52 includes a fixed contact 54 and a pivoted contact 55 normally in the open position of said switch 52. The pivoted contact is set up as an armature of the magnet 47 (see Fig. 3), and the arrangement is such that when the said magnet is energized, the armature is moved so as to cause the contacts 54 and 55 to engage and the second relay circuit having said contacts to be closed to energize the second solenoid 50 and thus cause said solenoid to lift the balanced valve 32, to open the passage 40 and outlet 38, and close the passage 41 and outlet 39. When the water content at the electrodes becomes less than the predetermined amount so that the strength of the current of the transformer circuit becomes insufficient to hold the armature 44 of the solenoid 30 lifted to close the relay switch 31, the said armature 44 falls by gravity, the switch 31 opens, by reason of the inherent resiliency of its contact arms (see Fig. 4), the magnet 47 becomes de-energized, the pivoted contact 55 moves by gravity to open position (see Fig. 3), and thus, the solenoid 50 becomes de-energized to allow the balanced valve 32 to fall to its normal position as disclosed in said Fig. 3. It will be seen that the arrangement as illustrated and described accomplishes distribution of the oil, selectively via the outlet 38 or the outlet 39, depending upon the composition of separate portions thereof, to different predetermined locations. That is to say, the arrangement as fully disclosed provides for the distribution of relatively "wet" and relatively "dry" oil to different places or containers. It will be readily apparent that the distribution of the oil could be to a number of different locations in excess of two as shown.

We deem it desirable that the armature 44 of the solenoid 30 be slow acting, and, therefore, we preferably associate a dash pot 56 with the said armature. See Fig. 4.

As shown more clearly in Fig. 1, a casing 57, integral with the pipe 10 and having a cover 58, constitutes a housing for the various parts of the device.

The above description gives one of several arrangements of equipment which may be utilized. We desire it understood, however, that the present disclosure is merely illustrative of the principles of our invention and intended in no way in a limiting sense. The detecting means could be associated directly with either the primary or secondary of the transformer circuit, or a step-down transformer could be placed in the secondary circuit of the transformer so as to supply current to a relay when a current flows across the gap between electrodes of the water detector. The relay could be provided with an adjustable by-pass or could have an adjustable tension spring so that the by-pass could be set to operate only when a predetermined current flows through the relay. The relay could be made to operate a signal device, such as a light or bell. Also, the detecting means could operate a valve capable of controlling the flow of the fluid through the pipe 10, or the said detecting means could control the feed of a treating substance to the fluid.

In connection with our device we have employed a high tension transformer utilizing 110 volts on the primary and giving 20,000 volts on the secondary. With such high voltage on the secondary, proper insulation and design of electrodes is a problem requiring special attention. We have found it advisable to provide relatively long insulation about the central electrode and extending in the direction of flow of the fluid. When shorter insulation is employed, accumulated moisture upon the surface of the insulator has a tendency toward reducing the resistance to an extent sufficient to allow leakage or breakdown along said insulator to the pipe, instead of across the gap between the electrodes. Short circuiting thus occurring along the surface of the insulator causes cracking of the oil, resulting in a conducting deposit of carbon on the insulator. To prevent any tendency toward short circuiting in the way mentioned, we desirably employ a suitable insulation so constructed and arranged in the pipe 10 that the distance from the exposed point of the central electrode to the wall of the pipe, measured along the surface of the insulation is about 18 inches.

Any excessive amounts of moisture having a tendency toward adhering to either electrode are continuously removed by the body of flowing oil, which flows at right-angles to the gap between the electrodes, contacting directly with both electrodes. The design of the electrodes should be such that there is no chance for pockets of dead oil or air to collect to thus cause erroneous indications to be made.

We have determined that temperature and water content are the only variables necessary to be considered in the operation of our device, and that the presence of salts, such as sodium and magnesium chlorides, and of solid matter, such as mill scale or the like, has no effect upon the operation which need be considered in computing the setting of the electrodes when an oil is to be inspected.

When oil containing water is made to flow past the electrodes, as, for example, through a pipe such as indicated at 10, the water may not, perhaps, be uniformly distributed across the entire cross-sectional area of the pipe. We, therefore, place a self-cleaning cone 59 ahead of the gap between the electrodes 11 and 12, to cause the oil and water of the flowing body of liquid to mix intimately and uniformly across their entire cross-sectional area so that the portions of oil as they pass the gap will be representative. The before mentioned self-cleaning cone 59 is desirably constructed of wire gauze and arranged so that the approaching liquid enters the base of said cone and with a portion of the screen left open at the apex of said cone, all as shown in the drawings.

Our improved device can be put to many important uses several of which could be to detect the water content of oil. One very important use could be in connection with an oil cracking still, to give warning when dangerous oil (having a high percentage of water) approaches the still, or to divert the dangerous oil away from the still. Another important use could be in connection with water separators in oil fields, to inspect oil being pumped from the separators into the pipe lines.

Having thus described our invention, what we claim and desire to secure by Letters Patent of the United States, is:

1. In an apparatus of the class described, a plurality of spaced electrodes exposed to the flow of a fluid medium to be distributed, means for maintaining said electrodes at a high potential difference, means to mix said fluid medium as it approaches said electrodes, and means responsive to the flow of current across said electrodes to control the distribution of said flowing medium.

2. In an apparatus of the class described, a plurality of spaced high tension electrodes exposed to the flow of a liquid mixture, a self-cleaning mixing screen arranged in the path of the liquid as said liquid approaches said electrode space, said screen being of conical shape and arranged for the approaching liquid to enter the base of said cone and having a portion at the apex of said cone left open.

3. An apparatus for determining the composition of a flowing liquid body and for selectively distributing the flow of said body to predetermined locations determined by the conductivity thereof comprising a channel member through which said liquid is adapted to flow, a plurality of spaced electrodes exposed to the liquid to be distributed, at least one of said electrodes being provided with an insulating covering extending a substantial distance between its exposed end and its support, means for maintaining said electrodes at a high potential difference, means to mix said fluid medium as it approaches said electrodes, means surrounding said insulated electrode and adapted to cause said previously mixed liquid to sweep said electrode insulation while still in its mixed condition, and means responsive to the flow of current across said electrode to control the distribution of said flowing liquid body.

4. An apparatus for determining the composition of a flowing liquid and for selectively distributing the flow of said liquid to predetermined locations determined by the conductivity thereof comprising a channel for the flow of the liquid, an electrode provided with an insulating covering extending into said passage in a direction in which the flow of liquid sweeps its surface to prevent the accumulation of conducting substances thereon, a grounded electrode extending into said channel and spaced from the exposed end of said insulated electrode, means to supply a high potential difference between said electrodes, means to adjust said grounded electrode for obtaining the desired current flow between the electrodes, and means responsive to said current to selectively cause the distribution of said liquid to predetermined locations dependent upon the conductivity of said fluid.

ORRIN E. ANDRUS.
KARL S. WILLBORG.